United States Patent [19]

Kitamura

[11] 3,823,385

[45] July 9, 1974

[54] REMOTE CONTROL SYSTEM UTILIZING F.S.K. AND FREQUENCY SEQUENCE DISCRIMINATOR MEANS

[75] Inventor: Tsutomu Kitamura, Fujisawa, Japan

[73] Assignee: Matsushita Electric Industrial Co., Ltd., Osaka, Japan

[22] Filed: Feb. 26, 1973

[21] Appl. No.: 336,064

[30] Foreign Application Priority Data

Feb. 29, 1972 Japan .............................. 47-21357
Mar. 3, 1972 Japan .............................. 47-22522

[52] U.S. Cl. .............................. 340/171 R, 325/30
[51] Int. Cl. .............................. H04j 1/20
[58] Field of Search ...... 340/171 R, 164 R, 171 PF; 325/30, 320, 349, 487, 37

[56] References Cited

UNITED STATES PATENTS

| | | | |
|---|---|---|---|
| 3,244,986 | 4/1966 | Rumble | 325/30 UX |
| 3,271,680 | 9/1966 | Reynolds | 340/171 R X |
| 3,355,709 | 11/1967 | Hanus | 340/164 |
| 3,412,205 | 11/1968 | Saeger | 325/320 X |
| 3,492,576 | 1/1970 | Warters | 325/30 |
| 3,510,776 | 5/1970 | Boenke | 325/349 X |
| 3,705,363 | 12/1972 | Okada | 340/171 R X |
| 3,719,779 | 3/1973 | Wilson | 325/30 X |

*Primary Examiner*—Donald J. Yusko
*Attorney, Agent, or Firm*—Stevens, Davis, Miller & Mosher

[57] ABSTRACT

A remote control system using a signal consisting of portions of mutually different frequencies. The transmitter unit transmits a continuous signal which is formed by changing the frequency of the signal at a predetermined period. The receiver unit receives this continuous signal, and discriminates the frequency, taking the AND output of this discriminated signal and a delayed signal thereof to obtain a control signal. The transmitter unit comprises a simple structure consisting of a signal generator capable of generating signals of different frequencies, whereas the receiver unit can prevent errors in the operation of the control due to noises etc.

4 Claims, 20 Drawing Figures

FIG. 4
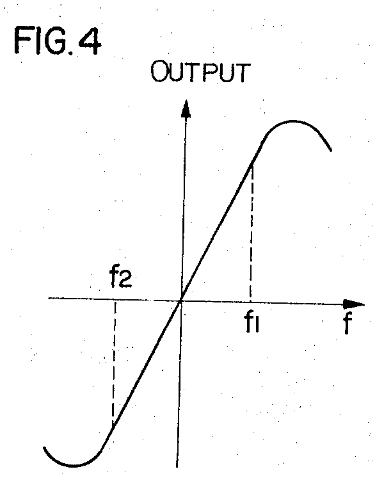
FIG. 5
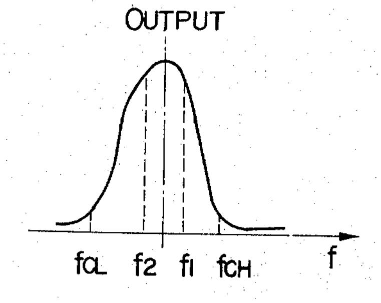
FIG. 6
| Period | Detected output | Output of monostable multivibrator 17 | Output of AND gate 18 |
|---|---|---|---|
| Before $T_0$ | 0 | 0 | 0 |
| $T_0 \sim T_1$ | + | − | 0 |
| $T_1 \sim T_2$ | − | − | + |
| $T_2 \sim T_3$ | − | 0 | 0 |
| After $T_3$ | 0 | 0 | 0 |
FIG. 7
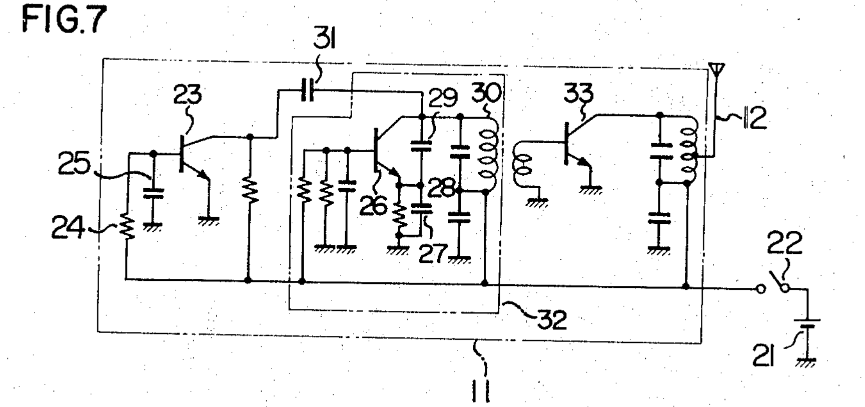

REMOTE CONTROL SYSTEM UTILIZING F.S.K. AND FREQUENCY SEQUENCE DISCRIMINATOR MEANS

This invention relates to a remote control system and more particularly to the system for remote-controlling a television receiver set, etc.

Description will be made referring to the accompanying drawings in which.

Figure 2:
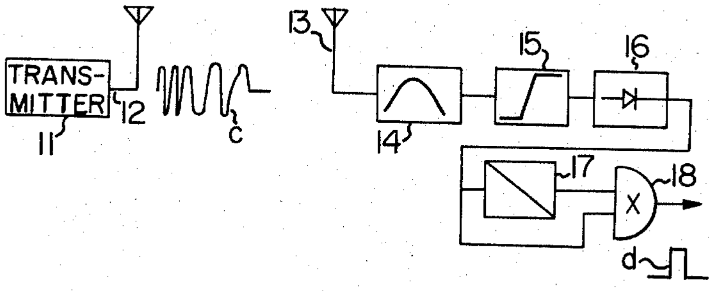
FIG. 2 is a block diagram of an embodiment of a remote control system according to this invention.
Figures 3A, 3B, 3C, 3D:
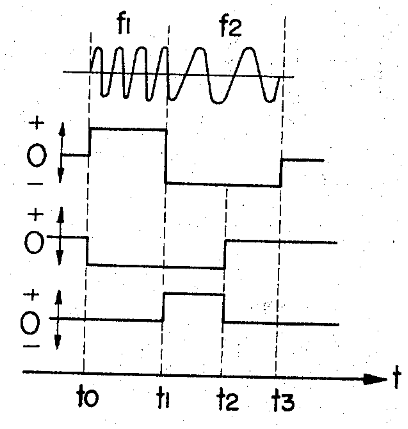
Figure 8:
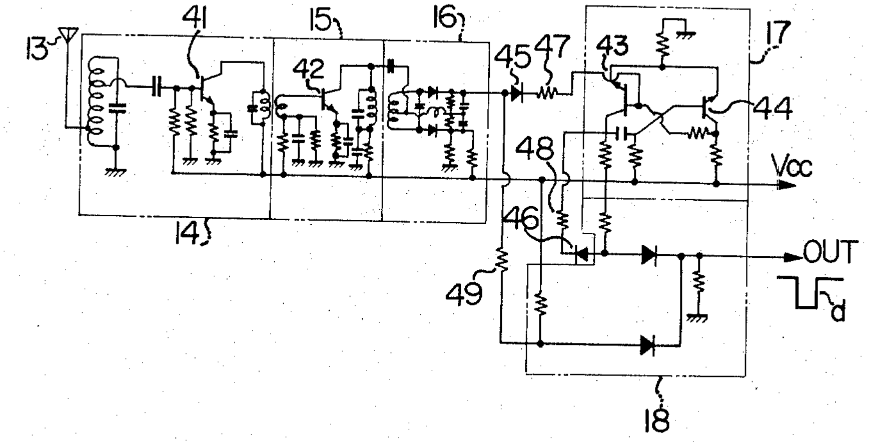
Figure 10:
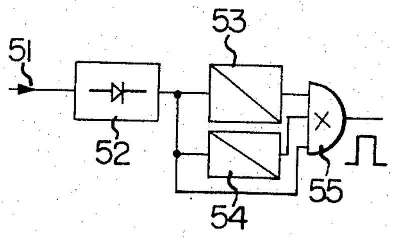
Figures 11A, 11B, 11C, 11D, 11E:
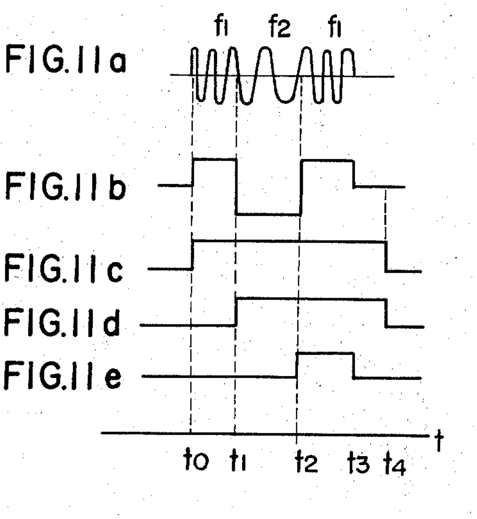
Figure 12:
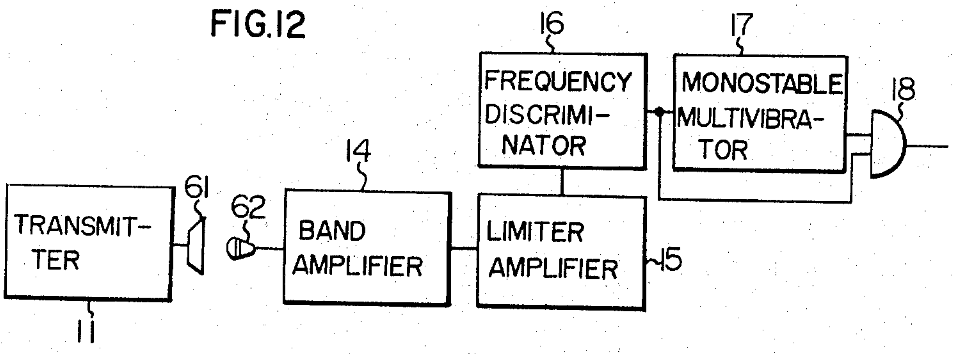

FIGS. *3a* to *3d* show output waveforms in the circuit of FIG. 2;

FIG. 4 shows a characteristic curve of the discriminator used in the circuit of FIG. 2;

FIG. 5 shows the frequency characteristic of the bandpass amplifier and the limiter amplifier of the receiver circuit of FIG. 2;

FIG. 6 illustrates the operation of the circuit of FIG. 2;

FIGS. 7 and 8 show examples of concrete electrical connection;

FIGS. *9a* to *9b* show signal waveforms at the main portions of the circuit of FIG. 7;

FIG. 10 is a partial block diagram of another embodiment of the remote control system according to this invention;

FIGS. 11*a* to 11*e* show output signal waveforms at various portions of the circuit of FIG. 10; and FIG. 12 is a block diagram of further embodiment according to this invention.

Figure 1:
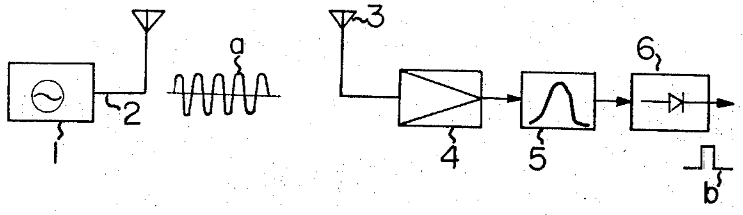
FIG. 1 is a block diagram of a conventional remote control system.

In conventional television receivers, etc., remote control has been done using a remote control system having a structure as shown in FIG. 1. In the figure, the signal of a particular frequency generated from a transmitter circuit 1 is sent out through a transmission antenna. The sent signal *a* is caught by a receiving antenna 3 and amplifier through an anplifier 4. A band pass filter 5 takes out a predetermined frequency component from said amplified signal and applies it to a detector 6 to derive a control signal *b*.

In such a system, however, errors in the operation are apt to be caused by external noises due to atmospheric phenomenon, automobile noise, etc. Thus, stray signals caused by such external noise may cause a television receiver which has been turned off to turn itself on again.

An object of this invention is to prevent such error operations safely.

Another object of this invention is to achieve the above object with a simple structure utilizing one frequency discriminator for discriminating a plurality of frequencies.

Further object of this invention is to simplify the structure by generating a signal having a plurality of frequencies from one oscillator.

Now, embodiments of this invention will be described.

In FIG. 2, a transmitter unit comprises a transmitter circuit 11 for generating a signal *c* formed of portions of two different frequencies by mechanical or electrical change-over and a transmission antenna 12 for emitting this signal. A receiver unit comprises a receiving antenna 13 for receiving the propagated signal *c*, a bandpass amplifier 14, a limiter amplifier 15, a frequency discriminator 16, a monostable multivibrator 17 for delaying the signal, an AND gate 18 for receiving the signal and the delayed signal and providing an output signal *d*. The receiver unit can provide an output signal *d* only when a predetermined signal is sent from the transmitter unit.

The operation of this embodiment will be described hereinbelow referring to FIGS. 3 to 6. It is assumed, here, that the transmitter circuit 11 generates a signal the frequency of which is changed from $f_1$ to $f_2$ as shown by a curve in FIG. *3a*. Namely, this signal has a frequency $f_1$ in the period from $t_0$ to $t_1$ and another frequency $f_2$ in the period from $t_1$ to $t_3$. The signal received by the antenna 13 is allowed to pass through the bandpass amplifier 14 and the limiter amplifier 15 to remove noises in the undesired bands, pulse noises, and amplitude modulated noises. The processed signal is applied to the frequency discriminator 16 which has such a characteristic as shown in FIG. 4 between the frequency of the input signal and the output. Therefore, when the signal as shown in FIG. *3a* is applied to the discriminator 16, a signal as shown in FIG. *3b* is generated therefrom. The monostable multivibrator 17 is triggered by the signal between $t_0$ and $t_1$, and generates an output as shown in FIG. *3c*. The inversion period $t_0$ to $t_2$ of the monostable multivibrator 17 is, as is well known, determined by the resistance and the capacitance for determining the time constant. Next, since the detected output of the frequency discriminator 16 is negative from $t_1$ to $t_3$ as shown in FIG. *3b*, the AND gate 18 becomes open from $t_1$ to $t_2$ and supplies a control signal as shown in FIG. *3d*. Here, the output of the monostable multivibrator 17 returns to the zero level at time $t_2$ on and hence the AND gate 18 also closes from $t_2$ on. Namely, the output of the AND gate 18 changes as is shown in FIG. 6 during the period $t_0$ to $t_3$.

Thus, the control signal *d* is produced during the period from time $t_1$ to $t_2$ from the signal of two frequencies $f_1$ and $f_2$.

Now, the possibility of error operation will be discussed. Referring to FIG. 5, disturbing waves in the unnecessary bandwidths, i.e., below $f_{CL}$ and above $f_{CH}$, pulse noises and amplitude modulated noises are removed by the frequency band characteristic of the bandpass amplifier 14 and the amplitude limiting characteristic of the limiter amplifier 15, as has been described above. Further, if a disturbing wave corresponding to the frequency $f_1$ component comes in, only the output of the monostable multivibrator 17 becomes negative but the AND gate 18 does not open. If a disturbing wave corresponding to the frequency $f_2$ component comes in, the output of the multivibrator 17 maintains a zero level and the AND gate 18 does not open.

Further, if disturbing waves corresponding to the frequency $f_1$ and $f_2$ components come in simultaneously, the detected output maintains a zero level by the characteristic of the frequency discriminator 16 as shown in FIG. 4 and the AND gate 18 remains closed.

When a disturbing wave corresponding to the frequency $f_1$ component has arrived and another disturbing wave corresponding to the frequency $f_2$ component arrives after time $t_2$ has passed, no error operation occurs since the output of the multivibrator 17 has returned to zero level.

As is described hereinabove, the remote control system according to the embodiment of this invention is arranged to operate only by a signal the frequency of which changes from $f_1$ to $f_2$ during $t_0$ to $t_1$ (it does not operate if the frequency changes from $f_2$ to $f_1$). Thus, error operation rarely occurs.

Next, more detailed structure of the embodiment of FIG. 2 will be described.

FIG. 7 shows a detailed structure of the transmitter unit and FIG. 8 shows a detailed structure of the receiver unit. In FIG. 7, numeral 21 indicates a power source, 22 a power switch for controlling the oscillation, 23 a switching transistor having a base connected to a time constant circuit consisting of a resistor 24 and a capacitor 25, 26 a transistor constituting a Colpitts oscillator 32 having a resonance circuit determined by capacitors 27, 28 and 29 and a coil 30, 31 a capacitor capable of being connected in parallel to capacitors 27 and 29, and 33 an amplifying transistor.

Figures 9A, 9B:
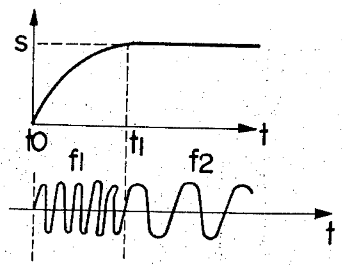

The operation of the circuit of FIG. 7 will be described. The transistor 23 is turned on with a certain time delay after the power switch 22 is engaged due to the time constant circuit formed of a resistor 24 and a capacitor 25. Namely, referring to FIG. 9, when the switch 22 is turned on at time $t_0$ the base potential of the transistor 23 increases at a time constant determined by the resistor 24 and a capacitor 25 as shown in FIG. 9*a* and reaches the threshold voltage (point S in FIG. 9*a*) of the transistor 23. Then, the transistor 23 becomes conductive. Then, since a capacitor 31 is connected to the collector of the transistor 23, one end of the capacitor 31 becomes grounded. The other end of the capacitor 31 is connected in parallel with the resonating capacitors 27, 28 and 29 of the Colpitts oscillator 32 and the oscillation frequency becomes low. Namely, when the switch 22 is thrown in a time $t_0$ as shown in FIG. 9*b*, the Colpitts oscillator oscillates at a frequency determined by the resonance circuit formed of the coil 30 and the capacitors 27, 28 and 29 until time $t_1$, but from time $t_1$ on, the capacitor 31 is connected in parallel with the capacitors 27, 28 and 29 and the oscillation frequency becomes low. Here, it is possible to raise the oscillation frequency from time $t_1$ if the capacitor 25 and the resistor 24 are interchanged.

Such an operation can also be achieved by using, in place of the transistor 23, a mechanical switch which closes after some delay from the time when the power switch 22 closes. In such a case, however, the switch becomes complicated and expensive. Further, the change-over period $t_0$ to $t_1$ may become hard to maintain constant or poor contact may occur.

When the oscillation circuit is formed by the use of a transistor 23 as in the embodiment of FIG. 7, signals of two different frequencies can be safely changed on the time axis by throwing the switch 22 having a single pole 22 which is cheap in cost. Further, the change-over period from $t_0$ to $t_1$ can also be maintained constant.

The signal generated by this Colpitts oscillator 32 is amplified through the transistor 33 and emitted into the air through the antenna 12.

FIG. 8 shows the detailed structure of the receiver unit in which similar numerals are used to indicate similar parts as those of FIG. 2. In the figure, numeral 41 indicates a transistor forming the bandpass amplifier, 42 a transistor forming the limiter amplifier, 43 and 44 transistors forming a monostable multivibrator 17, 45 and 46 buffer diodes, and 47, 48 and 49 resistors for adjusting level among the circuits.

In the above described embodiment, remote control is carried out by one frequency change. If a plurality of monostable multivibrators of different delay times are provided in the receiver unit, remote control can be done through a plurality of frequency changes.

FIG. 10 shows the main structure of such a receiver unit. In the transmitter circuit, frequencies $f_1$ and $f_2$ are changed at a predetermined time period to form a signal containing successive signals having frequencies $f_1$, $f_2$ and $f_1$ as shown in FIG. 11*a*. The signal received from the antenna and derived through the bandpass amplifier 14 and the limiter amplifier 15 is applied to a line 51 and to a frequency discriminator 52. This discriminator 52 generates a signal as shown in FIG. 11b which is applied to an AND gate directly and through monostable multivibrators 53 and 54. The monostable multivibrators 53 and 54 generate signals as shown in FIGS. 11*c* and 11*d*, respectively. Thus, a control signal as shown in FIG. 11*e* can be obtained from the AND gate 55. In this case, one control signal is made from the coexistence of three signals and hence the prevention of error operation becomes more perfect. As is described above, when two frequencies $f_1$ and $f_2$ are alternated especially a plurality of times, there can be provided an almost equivalent effect of preventing error operation to the case of exchanging a multiplicity of mutually different frequencies. Thus, a remote control system having a simple structure and superior characteristics can be provided by utilizing two frequencies.

Further, besides the system using electromagnetic waves for a transmitting a signal from the transmitter unit to the receiver unit, a system using an ultrasonic wave for propagating a singal can be made. FIG. 12 shows such an embodiment, in which loud speaker 61 and a microphone 62 are used in place of the transmission and receiving antennas of the embodiment of FIG. 2.

I claim:

1. A remote control system, including means to transmit a continuous signal composed of two mutually distinct frequencies $f_1$ and $f_2$ which alternate at least once during a predetermined time period, and means to receive said continuous signal transmitted by said transmitting means, said receiving means comprising: frequency discriminating means, having an S-shaped characteristic curve, for generating a first output signal of one polarity when a signal of frequency $f_1$ is received by said receiving means and for generating a second output signal of opposite polarity from said first output signal when a signal of frequency $f_2$ is received by said receiving means; a delay circuit coupled to the output of said frequency discriminating means, said delay circuit including means triggered by said first output signal to generate a third output signal; and a logic circuit having a first input coupled to the output of said frequency discriminating means for receiving said second output signal and a second input coupled to the output of said delay circuit, said logic circuit including means generating an output signal only when an input signal is present on both of said first and second logic circuit inputs.

2. The system according to claim 1, wherein said transmitting means comprises: an oscillator, including a resonant circuit for generating a signal of frequency $f_1$; frequency changing means for changing the resonant frequency of said resonant circuit to generate a signal of frequency $f_2$; and switching means coupled to said frequency changing means to selectively engage and disengage said frequency changing means with and from said resonant circuit, respectively, said switching means comprising a charging capacitor, a switch element coupled to said capacitor and switched when the terminal voltage of said capacitor reaches a predetermined threshold, and a further switch element coupling said charging capacitor to a voltage source.

3. The system according to claim 1, wherein said receiving means further comprises a bandpass amplifier for passing only those signals received by said receiving means which are within a predetermined bandwidth and which include said frequencies $f_1$ and $f_2$; and limiter means interposed between said bandpass amplifier and said frequency discriminating means for limiting the amplitude of the output of said bandpass amplifier.

4. A remote control system according to claim 1, wherein said delay circuit includes a monostable multivibrator which is triggered only by a signal having one of positive and negative polarities to generate a pulse of a predetermined pulse width.

* * * * *